United States Patent
Chu

(10) Patent No.: US 10,675,816 B2
(45) Date of Patent: Jun. 9, 2020

(54) METHOD FOR DETECTING OBJECT BORDER OF 3D PRINTER

(71) Applicants: XYZPRINTING, INC., New Taipei (TW); KINPO ELECTRONICS, INC., New Taipei (TW)

(72) Inventor: Chung-Kang Chu, New Taipei (TW)

(73) Assignees: XYZPRINTING, INC., New Taipei (TW); KINPO ELECTRONICS, INC., New Taipei (TW)

(*) Notice: Subject to any disclaimer, the term of this patent is extended or adjusted under 35 U.S.C. 154(b) by 0 days.

(21) Appl. No.: 16/381,564

(22) Filed: Apr. 11, 2019

(65) Prior Publication Data
US 2020/0094483 A1 Mar. 26, 2020

(30) Foreign Application Priority Data
Sep. 20, 2018 (CN) .......................... 2018 1 1118707

(51) Int. Cl.
*B29C 64/393* (2017.01)
*B33Y 50/02* (2015.01)
(Continued)

(52) U.S. Cl.
CPC .......... *B29C 64/393* (2017.08); *B29C 64/386* (2017.08); *B33Y 10/00* (2014.12); *B33Y 40/00* (2014.12); *B33Y 50/02* (2014.12); *G05B 19/4099* (2013.01); *G06F 30/00* (2020.01); *G06T 15/10* (2013.01); *G06T 19/20* (2013.01);
(Continued)

(58) Field of Classification Search
CPC ..... B29C 64/386; B29C 64/393; B33Y 10/00; B33Y 30/00; B33Y 40/00; B33Y 50/00; B33Y 50/02; G05B 19/4099; G05B 2219/35134; G05B 2219/49007; G05B 2219/49023; G06F 30/00;
(Continued)

(56) References Cited

U.S. PATENT DOCUMENTS 10,052,824 B2 * 8/2018 Erb .................... B29C 64/10
10,336,054 B2 * 7/2019 Ho .................... B41J 3/4073
(Continued)

FOREIGN PATENT DOCUMENTS

WO      2016173065 A1    11/2016

OTHER PUBLICATIONS

Search Report dated Dec. 10, 2019 of the corresponding European patent application.

*Primary Examiner* — Crystal J Barnes-Bullock
(74) *Attorney, Agent, or Firm* — Chun-Ming Shih; HDLS IPR Services

(57) ABSTRACT

A method for detecting object border of 3D printer (4) includes following steps: obtaining a basic locating point (420) of a printing platform (42) of the 3D printer (4); projecting an imported 3D object onto a 2D plane of the 3D printer (4) for obtaining a plurality of 2D coordinates of the 3D object; calculating a 2D convex hull (60) according to the plurality of 2D coordinates; obtaining all vertexes (601) of the 2D convex hull (60); determining the position of the 3D object based on the basic locating point (420) in company with all the vertexes (601) of the 2D convex hull (60); and, permitting the 3D printer (4) to activate a printing procedure only if the 3D object is determined fully locating inside an effective range of the printing platform (42).

12 Claims, 8 Drawing Sheets

(51) Int. Cl.
*G05B 19/4099* (2006.01)
*B33Y 10/00* (2015.01)
*B29C 64/386* (2017.01)
*B33Y 40/00* (2020.01)
*G06F 30/00* (2020.01)
*G06T 15/10* (2011.01)
*G06T 19/20* (2011.01)
*B33Y 30/00* (2015.01)
*G06F 111/20* (2020.01)

(52) U.S. Cl.
CPC ..... *B33Y 30/00* (2014.12); *G05B 2219/35134* (2013.01); *G05B 2219/49007* (2013.01); *G05B 2219/49023* (2013.01); *G06F 2111/20* (2020.01); *G06F 2203/04103* (2013.01); *G06T 2219/2021* (2013.01)

(58) Field of Classification Search
CPC ....... G06F 2203/04103; G06F 2111/20; G06T 15/10; G06T 19/20; G06T 2219/2021
See application file for complete search history.

(56) References Cited

U.S. PATENT DOCUMENTS

| | | | |
|---|---|---|---|
| 10,379,687 B2* | 8/2019 | Luo | G06F 3/044 |
| 2013/0016208 A1* | 1/2013 | Duss | B41F 1/28 |
| | | | 348/92 |
| 2015/0042755 A1* | 2/2015 | Wang | B29C 64/393 |
| | | | 348/46 |
| 2015/0066179 A1* | 3/2015 | Stava | B29C 64/386 |
| | | | 700/98 |
| 2016/0107468 A1 | 4/2016 | Leynadier | |
| 2016/0279879 A1 | 9/2016 | Zheng et al. | |
| 2016/0302469 A1* | 10/2016 | Din | B33Y 30/00 |
| 2018/0043630 A1 | 2/2018 | Hoover et al. | |
| 2018/0275852 A1* | 9/2018 | Pettit | B33Y 50/02 |
| 2018/0350132 A1* | 12/2018 | Paulson | G06T 17/10 |
| 2018/0373227 A1* | 12/2018 | Sadusk | G06T 19/20 |
| 2020/0004225 A1* | 1/2020 | Buller | G05B 19/4099 |

* cited by examiner

METHOD FOR DETECTING OBJECT BORDER OF 3D PRINTER

BACKGROUND OF THE INVENTION

1. Technical Field

The technical field relates to a 3D printer, and specifically relates to a method for detecting a border of an object for a 3D printer.

2. Description of Related Art

A 3D printer is operated to control its printing nozzle to spray liquid material onto corresponding positions upon its printing platform based on an imported 3D object, so as to print a physical 3D model having an identical shape and appearance as the imported 3D object. Before the printing procedure is activated, a detecting procedure has to be previously performed by the 3D printer for detecting an arranged position of the 3D object imported by the user, so as to find out the border of the 3D object and ensure that the 3D object is in an effective range of the printing platform and prevent the printing procedure from failing.

Generally, a virtual bounding box will be created and used by a 3D printer of related art for roughly determining the arranged position of the 3D object in order to complete the aforementioned detecting procedure as soon as possible.

FIG. 1A is a first schematic diagram showing an object border of related art. FIG. 1B is a second schematic diagram showing the object border of related art. As shown in FIG. 1A, a 3D object 2 imported by a user is disclosed as a triangular awl. When detecting whether the 3D object 2 is fully located inside an effective range of a printing platform 1, the 3D printer first projects the whole 3D object 2 onto a 2D plane of the printing platform 1 for creating a plurality of 2D coordinates (as the coordinates (X1, Y1), (X1, Y2) and (X2, Y1) shown in FIG. 1A).

Next, as shown in FIG. 1B, a minimum-coordinate of the 3D object 2 upon an X-axis (which is X1), a maximum-coordinate of the 3D object 2 upon the X-axis (which is X2), a minimum-coordinate of the 3D object 2 upon a Y-axis (which is Y1) and a maximum-coordinate of the 3D object 2 upon the Y-axis (which is Y2) are obtained by the 3D printer. The 3D printer then creates a virtual bounding box 21 according to these four coordinates (X1,X2,Y1,Y2). In the embodiment shown in FIG. 1B, the bounding box 21 is a rectangular box, wherein the bounding box 21 indicates a maximum border of the 3D object. If the bounding box 21 dynamically created by the 3D printer is fully located inside an effective range of the printing platform 1, the 3D printer can assure that the imported 3D object 2 is definitely located within the effective range of the printing platform 1 (i.e., the border of the 3D object is inside the printing platform 1), in other words, the imported 3D object 2 is under a printing condition of the printing procedure.

According to the aforementioned approach, the 3D printer of the related art may quickly determine the location of an imported 3D object 2 upon the printing platform 1 by only obtaining four coordinates of the 3D object 2, which is very quick and convenient. However, if the printing platform 1 is not in a rectangular shape, using the aforementioned approach to detect the position of the 3D object 2 upon the printing platform 1 may cause some potential mistakes.

FIG. 2 is a third schematic diagram showing the object border of related art. In FIG. 2, the 3D printer includes a printing platform 3 which is in a round shape. As shown in FIG. 2, if the aforementioned approach is adopted to detect the position of the 3D object 2, the bounding box 21 created by the 3D printer will exceed an effective range of the printing platform 3, it turns out that the 3D printer may not allow the user to directly print the 3D object 2 on such position. However, although the bounding box 21 is determined exceeding the effective range of the printing platform 3, but the 3D object 2 itself is actually located within the effective range of the printing platform 3, which is under the printing condition of the printing procedure. In conclusion, the 3D printer of related art may misjudge about the 3D object 2 due to the inappropriate bounding box 21.

Accordingly, another method for quickly detecting the position of the 3D object is needed by the skilled person in the 3D printing field, which may be used by different 3D printers having different shapes of printing platforms.

SUMMARY OF THE INVENTION

The disclosure is directed to a method for detecting object border of 3D printer, which may quickly and accurately detect the position of a 3D object upon a printing platform of a 3D printer.

In one of the exemplary embodiments the method includes at least following steps: obtaining a basic locating point for a printing platform of a 3D printer; projecting an imported 3D object onto a 2D plane of the 3D printer for obtaining a plurality of 2D coordinates of the 3D object; calculating a 2D convex hull according to the plurality of 2D coordinates; obtaining the coordinates of all vertexes of the 2D convex hull; determining the located of the 3D object according to the basic locating point and the coordinates of the vertexes; and permitting the 3D printer to activate a printing procedure to print the 3D object if the 3D object is determined fully located within an effective range of the printing platform.

In comparison with related art, even if a printing platform of a 3D printer is not in a rectangular shape, the 3D printer may still quickly and accurately detect whether a 3D object to be printed is fully located within an effective range of the printing platform, which is very useful and convenient.

DETAILED DESCRIPTION OF THE INVENTION

In cooperation with the attached drawings, the technical contents and detailed description of the present invention are described thereinafter according to multiple embodiments, being not used to limit its executing scope. Any equivalent variation and modification made according to appended claims is all covered by the claims claimed by the present invention.

Figure 1A:
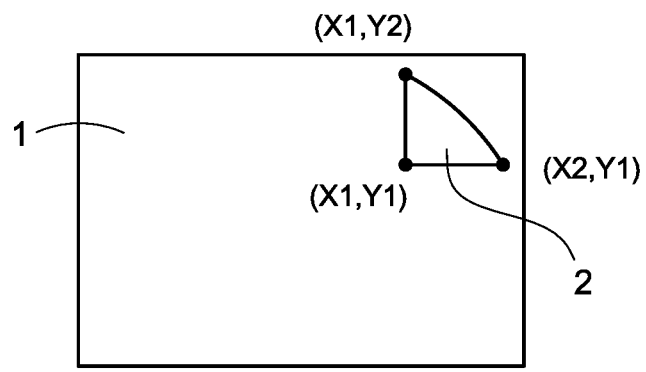
FIG. 1A is a first schematic diagram showing an object border of related art.
Figure 1B:
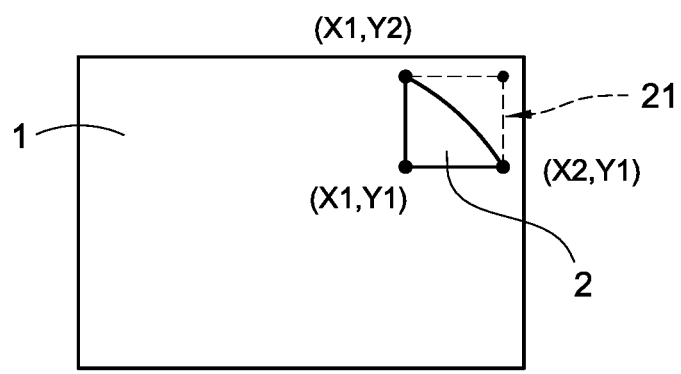
FIG. 1B is a second schematic diagram showing the object border of related art.
Figure 2:
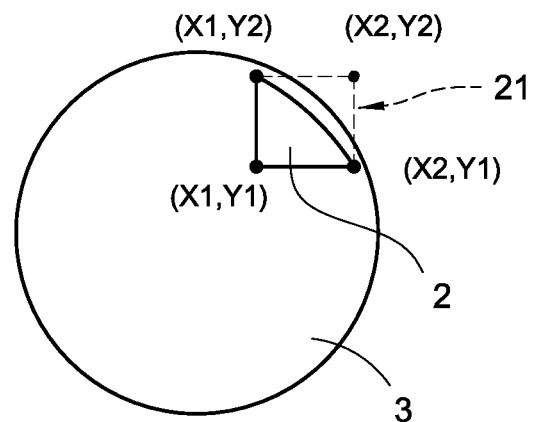
FIG. 2 is a third schematic diagram showing the object border of related art.
Figure 3:
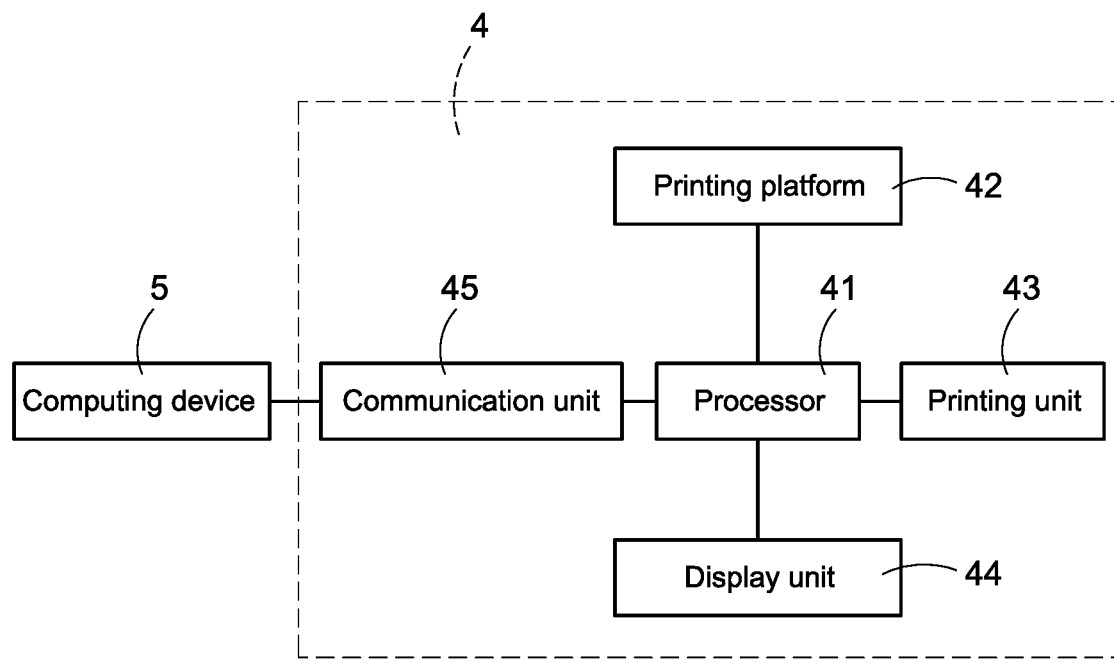
FIG. 3 is a first embodiment of a block diagram showing a 3D printer of the present invention.
Figure 4:
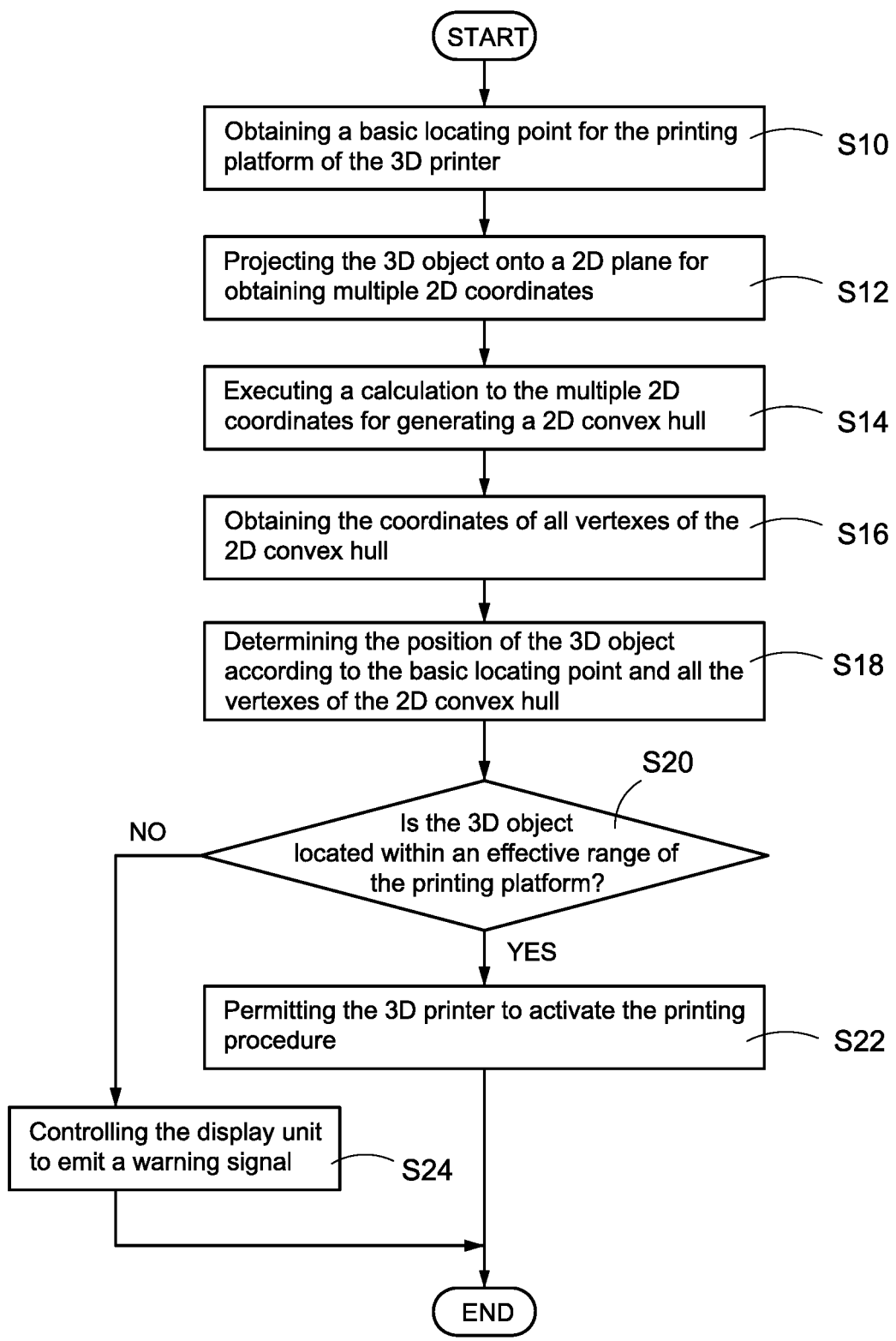
FIG. 4 is a first embodiment of a flowchart showing a detecting method of the present invention.

FIG. 3 is a first embodiment of a block diagram showing a 3D printer of the present invention. FIG. 4 is a first embodiment of a flowchart showing a detecting method of the present invention. The present invention discloses a method for detecting object border of 3D printer (referred to as a detecting method hereinafter), the detecting method is mainly adopted by a 3D printer 4 or a computing device 5 as shown in FIG. 3.

As disclosed in FIG. 3, the 3D printer 4 as rendered is connected with the computing device 5 via wired or wireless manner, so the 3D printer 4 is able to receive data from the computing device 5 for performing a printing procedure. In one embodiment, the 3D printer 4 may receive processed slicing data from the computing device 5, and the 3D printer 4 may directly start performing the printing procedure based on the received slicing data. In another embodiment, the 3D printer 4 may receive original 3D images of a 3D object from the computing device 5, and the 3D printer 4 may get into the printing procedure after the 3D images are processed with a slicing process by an internal processor 41 of the 3D printer 4. The slicing process mentioned above is just a common technical solution in 3D printing field, detailed description is thereby omitted.

The 3D printer 4 mainly includes the aforementioned processor 41, and a printing platform 42, a printing unit 43, a display unit 44 and a communication unit 45 which are electrically connected with the processor 41. In one embodiment, the detecting method of the present invention may be performed by the processor 41 of the 3D printer 4. In another embodiment, the detecting method of the present invention may be performed by the computing device 5 as well, and the computing device 5 may control the 3D printer 4 in performing the printing procedure according to a detecting result generated from the detecting method, not limited thereto.

In one embodiment, the 3D printer 4 may be a stereolithography (SLA) type 3D printer. In this case, the printing platform 42 may be a holding tank for containing curable liquid material (such as light sensitive resin), and in particular, the printing platform 42 indicates a bottom face of the holding tank. In this embodiment, the printing unit 43 may be a laser light source, which is configured to emit light aim at the liquid material inside the printing platform 42 for curing the liquid material and transforming the cured liquid material into a 3D object with a desired size and shape.

In another embodiment, the 3D printer 4 may be a fused deposition modeling (FDM) type 3D printer, the printing platform 42 may be a supporting plane. In this embodiment, the printing unit 43 may be a nozzle(s), which is configured to spray material onto the printing platform 42, so as to construct a 3D object with a desired size and shape by stacking the sprayed material upon the printing platform 42.

For the sake of understanding, the FDM-type 3D printer will be taken as an example in the following discussion, however, the scope of the present invention is not limited to the FDM-type 3D printer only.

In the embodiment, the printing platform 42 of the 3D printer 4 may be controlled by the processor 41 to perform different actions such as rising, descending, rotating, etc., so as to assist the 3D printer 4 in performing the printing procedure. In another embodiment, however, the printing platform 42 may also be fixed at a specific position inside the 3D printer 4 without any movement. If the printing platform 42 is unmovable, the printing platform 42 is unnecessary to be electrically connected to the processor 41.

The printing unit 43 can be controlled by the processor 41 to move in 2-dimension (i.e., along an X-axis and a Y-axis upon the 3D printer 4) or in 3-dimension (i.e., along an X-axis, a Y-axis and also a Z-axis upon the 3D printer 4), so as to print a physical 3D model upon the printing platform 42. In this embodiment, the 3D printer 4 is an FDM-type 3D printer, the printing unit 43 is a 3D nozzle configured for spraying material(s). In another embodiment, the printing unit 43 includes a 3D nozzle for spraying material and also a 2D nozzle for jetting color inks. It should be mentioned that if the 3D printer 4 is the aforementioned SLA-type 3D printer, the printing unit 43 will be an illuminating unit configured for providing point-light source or area-light source in order to cure the liquid material (such as light sensitive resin).

The display unit 44 is configured to display information relative to the 3D printer 4, so a user may quickly get to know the current status about the 3D printer 4. In one embodiment, the display unit 44 may also display the detecting result generated by the detecting method, for example, is a 3D object fully located inside the effective range of the printing platform 42, is the 3D object should be further edited, is the printing procedure able to be activated, etc.

The 3D printer 4 is connected with the computing device 5 through the communication unit 45, so as to receive data (such as slicing data of a 3D object, 3D images of a 3D object, detecting result generated by the detecting method, etc.) from the computing device 5. In the embodiment, the communication unit 45 may be a wired communication unit (such as a connector) or a wireless communication unit (such as a Wi-Fi module or a Bluetooth module), but not limited thereto.

One of the technical effects of the detecting method is that, the 3D printer 4 or the computing device 5 may quickly and accurately determine the position of a to-be-printed 3D object located upon the printing platform 42 (i.e., where the border of the 3D object is upon the printing platform 42), so as to prevent the printing procedure from failing due to the inappropriate position of the 3D object arranged by the user while editing the 3D images of the 3D object.

In one embodiment, each step of the detecting method is respectively performed by the processor 41 of the 3D printer 4. In another embodiment, each step of the detecting method is respectively performed by the computing device 5 which connected with the 3D printer 4. For the sake of understanding, the processor 41 of the 3D printer 4 will be taken as an example for performing every step of the detecting method in the following discussion, however, the content of the following discussion is adaptable to the computing device 5 as well.

Whenever a 3D object is imported to the 3D printer 4, it means a user has the intent to print this 3D object, so the processor 41 of the 3D printer 4 may automatically execute the detecting method for determining whether the located position of the 3D object satisfied a printing condition of the printing procedure. The 3D object here in the embodiment may include the slicing data which has been processed by the slicing process and also the 3D images before being sliced. By way of the detecting method, the 3D printer 4 (or the computing device 5) may be prevented from misjudging that a part of the 3D object is outside of the printing platform 42 if the 3D object itself as a whole is actually located within the effective range of the printing platform 42 (i.e., the border of the 3D object is actually inside the printing platform 42). Besides, after executing the detecting method, the processor 41 may automatically adjust the located position of the 3D object to another position that is way more suitable for printing, so the problem will be automatically overcome if a part of the 3D object is actually outside of the printing platform 42, therefore the 3D printer 4 is then permitted to start printing the 3D object.

As shown in FIG. 4, when performing the detecting method of the present invention, the processor 41 first obtains a basic locating point for the printing platform 42 of the 3D printer 4 (step S10), the basic locating point in this embodiment is defined and used to decide the coordinates of each position of the printing platform 42.

Next, the processor 41 projects the imported 3D object onto a 2D plane (i.e., an X-Y plane upon the 3D printer 4) for obtaining multiple 2D coordinates of the 3D object (step S12). In particular, the 3D object is defined as a 3-dimensional virtual object, the step S12 is executed to set a Z-axis value of each 3D coordinates (X,Y,Z) of the 3D object as "0", so as to transform multiple 3D coordinates (X,Y,Z) of the 3D object into multiple 2D coordinates (X,Y,0).

After the step S12, the processor 41 executes a calculation to the multiple 2D coordinates of the 3D object for generating a 2D convex hull (step S14). In the embodiment, the 2D convex hull is a minimum convex polygon which can encompass all the 2D coordinates of the 3D object, and the 2D convex hull is used for indicating the border of the 3D object. The processor 41 then obtains the coordinates of all vertexes of the 2D convex hull (step S16). In the embodiment, the amount of the vertexes of the 2D convex hull is equal to or less than the amount of the multiple 2D coordinates of the 3D object.

Next, the processor 41 determines the position of the 3D object upon the X-Y plane according to the basic locating point and all the vertexes of the 2D convex hull (step S18), and determines whether the 3D object is located within an effective range of the printing platform 42 of the 3D printer 4 according to the position of the 3D object (step S20). If the processor 41 determines in the step S20 that the 3D object is fully located within the effective range of the printing platform 42, the 3D printer 41 is permitted to activate the printing procedure for printing the 3D object (step S22). If the processor 41 determines in the step S20 that the 3D object as a whole is not fully located within the effective range of the printing platform 42 (i.e., the border of the 3D object exceeds the printing platform 42), the display unit 44 can be controlled to emit a warning signal (step S24), so as to request the user to adjust the position of the 3D object (for example, to re-edit the 3D images of the 3D object through the editing software of the computing device 5).

By using the detecting method of the present invention, if the user uses the editing software wrong and edits or puts the 3D object to an inappropriate position (i.e., beyond the effective range of the printing platform 42), the 3D printer 4 and/or the computing device 5 may automatically detect this mistake and the printing procedure will be forbidden before the mistake is corrected.

Figure 5:
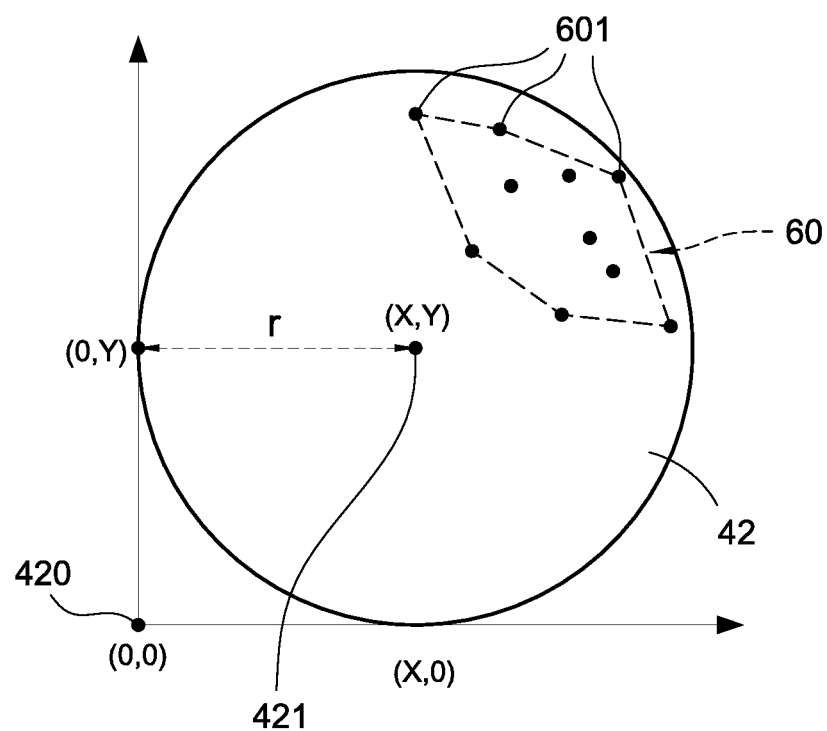
FIG. 5 is a first embodiment of a schematic diagram showing an object border of the present invention.

FIG. 5 is a first embodiment of a schematic diagram showing an object border of the present invention. In the embodiment as shown in FIG. 5, the printing platform 42 is in a round shape.

As shown in FIG. 5, after the processor 41 projects a 3D object onto a 2D plane, a plurality of 2D coordinates can be obtained. The processor 41 may perform a calculation to these 2D coordinates for generating a 2D convex hull 60, wherein the 2D convex hull 60 is defined for indicating the border of the 3D object. Also, the processor 41 obtains all vertexes 601 of the 2D convex hull 60. In particular, these vertexes 601 are all obtained from the plurality of 2D coordinates of the 3D object. In a first embodiment, the processor 41 is to calculate a distance between each vertex 601 of the 2D convex hull 60 and a circle center 421 of the printing platform 42 respectively, and compares each distance with a radius of the printing platform 42 respectively, so as to determine whether the 3D object as a whole is within the effective range of the printing platform 42 according to the comparison result.

Figure 6:
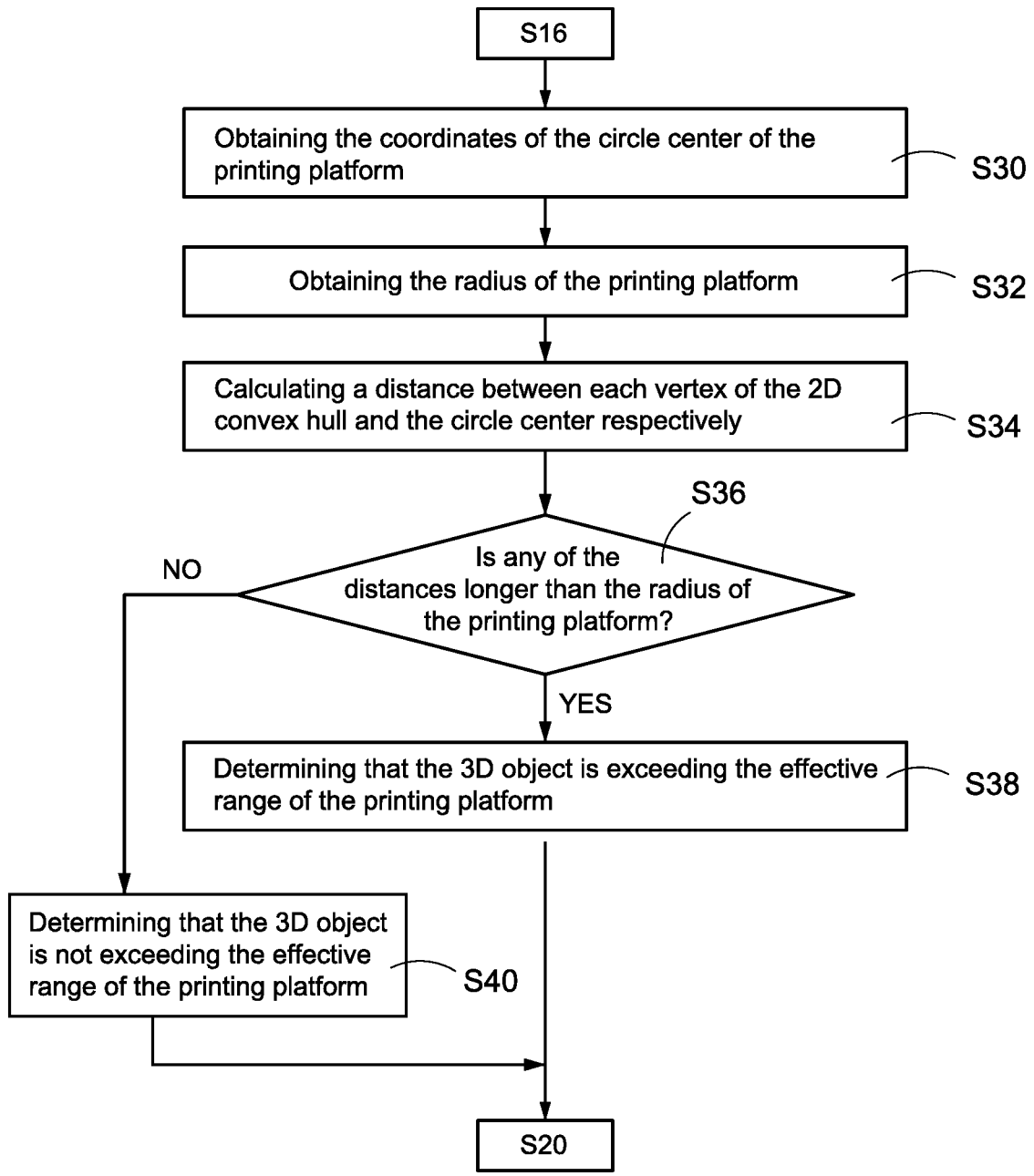
FIG. 6 is a first embodiment of a flowchart showing a determining approach of the present invention.

FIG. 6 is a first embodiment of a flowchart showing a determining approach of the present invention. FIG. 6 depicts a detailed description for the step S18 in FIG. 4.

In the step S16 of FIG. 4, the processor 41 may obtain the coordinates of all vertexes 601 of the 2D convex hull 60. Next, the processor 41 may further obtain the coordinates of the circle center 421 of the printing platform 42 (step S30), and also the radius of the printing platform 42 (step S32). In particular, the processor 41 has obtained the basic locating point 420 of the printing platform 42 (such as the coordinates (0,0) shown in FIG. 5) in the step S10 of FIG. 4, and the processor 41 in the step S30 of FIG. 6 is to calculate the coordinates of the circle center 421 (such as the coordinates (X,Y) in FIG. 5) according to the basic locating point 420 and the located position of the printing platform 42 within the 3D printer 4.

In this embodiment, the basic locating point 420 is defined and located at a lower-left corner of the 3D printer 4. In another embodiment, the basic locating point 420 can also be defined and located at an upper-left corner of the 3D printer 4, a lower-right corner of the 3D printer 4, an upper-right corner of the 3D printer 4, or a center of the 3D printer 4, not limited thereto.

In the step S32 of FIG. 6, the processor 41 is to calculate the coordinates of each edge position of the printing platform 42 according to the basic locating point 420 in company with the located position and the size of the printing platform 42, and then calculates the radius of the printing platform 42 based on the coordinates of the circle center 421 of the printing platform 42 and the coordinates of any one of the edge positions (such as the coordinates (0,Y) shown in FIG. 5).

In another embodiment, the 3D printer 4 may store the coordinates of the circle center 421 and the radius of the printing platform 42 in a memory unit (not shown) in advance while producing, therefore, in the step S30 and the step S32, the processor 41 may directly obtain the coordinates of the circle center 421 and also the radius of the printing platform 42 from the memory unit without conducting an instantly calculation.

Figure 7:
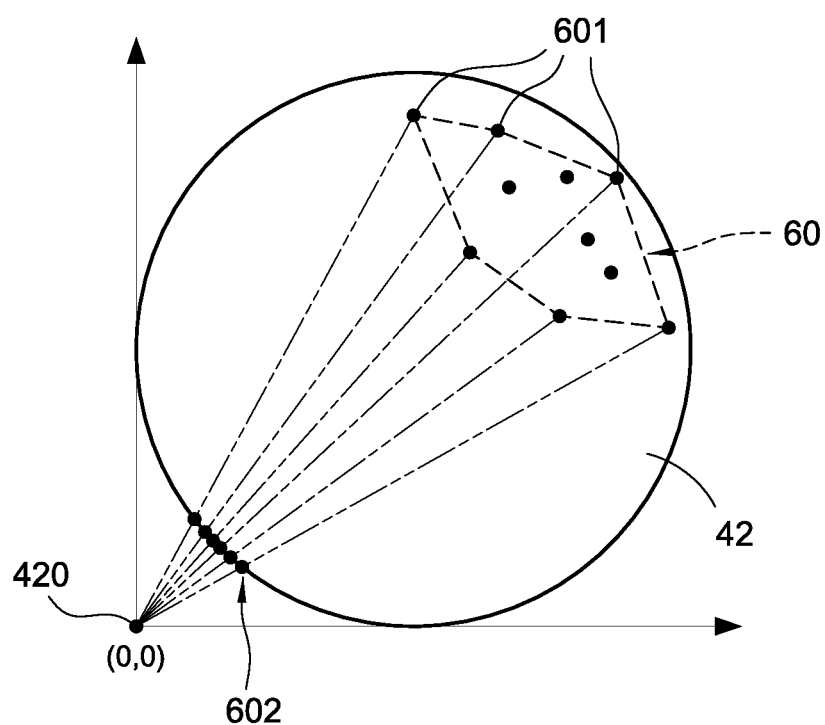
FIG. 7 is a second embodiment of a schematic diagram showing an object border of the present invention.

After the step S32, the processor 41 calculates a distance between each of the vertexes 601 of the 2D convex hull 60 and the circle center 421 of the printing platform 42 respectively (step S34), and determines if any of the calculated distances is longer than the radius of the printing platform 42 (step S36). In this embodiment, the processor 41 will determine that the 3D object as a whole is not fully located within the effective range of the printing platform 42 if any one of the calculated distances is longer that the radius of the printing platform 42 (step S38). On the other hand, the processor 41 will determine that the 3D object as a whole is fully located within the effective range of the printing platform 42 if all of the calculated distances are equal to or shorter than the radius of the printing platform 42 (step S40). After the step S38 or the step S40, the processor 41 may further perform the step S20 in FIG. 4, so as to determine whether the 3D printer 4 is permitted to activate the printing procedure. FIG. 7 is a second embodiment of a schematic diagram showing an object border of the present invention. In the embodiment as shown in FIG. 7, the printing platform 42 is in a round shape.

As shown in FIG. 7, after projecting a 3D object onto a 2D plane, a plurality of 2D coordinates of the 3D object can be obtained by the processor 41. The processor 41 may then conduct a calculation to these 2D coordinates for generating a 2D convex hull 60, and further obtains the coordinates of all vertexes 601 of the 2D convex hull 60. In a second embodiment, the processor 41 generates multiple connection lines respectively by connecting each of the vertexes 601 to the basic locating point 420, and determines whether the 3D object is fully located within the effective range of the printing platform 42 through the existence of intersection(s) of these connection lines and the printing platform 42.

Figure 9:
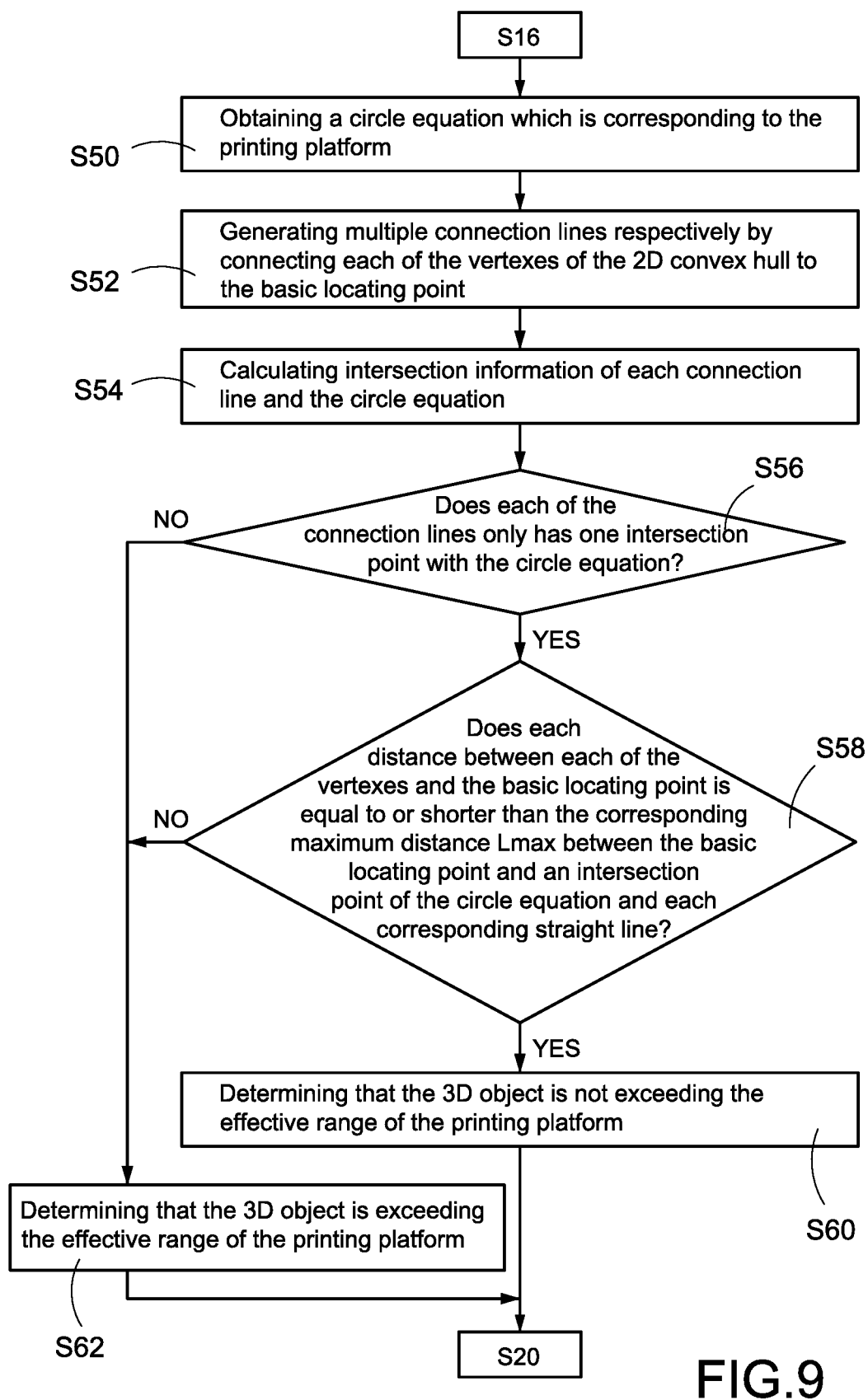
FIG. 9 is a second embodiment of a flowchart showing a determining approach of the present invention.

FIG. 9 is a second embodiment of a flowchart showing a determining approach of the present invention. FIG. 9 depicts another detailed description for the step S18 in FIG. 4 which is different from what is discussed in FIG. 6.

After the processor 41 obtains the coordinates of all vertexes 601 of the 2D convex hull 60 at the step S16 of FIG. 4, it may then obtain a circle equation (namely, equation of a circle) which is corresponding to the round printing platform 42 (step S50), and it also generates multiple connection lines respectively by connecting each of the vertexes 601 of the 2D convex hull 60 to the basic locating point 420 (step S52). In this embodiment, the circle equation matches the located position, the size and the shape of the printing platform 42, in other words, the circle equation can be solved by inputting the coordinates of any edge position of the printing platform 42 (which is in a round shape).

After the step S52, the processor 41 calculates intersection information of each connection line and the circle equation (step S54), so as to determine if each of the connection lines only has one intersection point 602 with the circle equation (step S56), i.e., if each of the connection lines only has one intersection point with the printing platform 42 of the 3D printer 4.

In particular, the aforementioned basic locating point 420 is defined as a position outside of the printing platform 42, if a connection line formed by one vertex 601 and the basic locating point 420 only has one intersection point 602 with the circle equation (i.e., only has one intersection point 602 with the printing platform 42), it means this vertex 601 is located inside the printing platform 42. If all connection lines formed by the vertexes 601 of the 2D convex hull 60 and the basic locating point 420 are respectively having only one intersection point 602 with the printing platform 42, it means all of the vertexes 601 upon the 2D convex hull 60 are located inside the printing platform 42, so the 3D object as a whole is fully located in the effective range of the printing platform 42 (i.e., the border of the 3D object is inside the printing platform 42).

However, if a vertex 601 is located on a tangent line of the printing platform 42 passing through the basic locating point 420, it may still be at a position outside of the printing platform 42 even if the connection line formed by this vertex 601 and the basic locating point 420 only has one intersection point 602 with the printing platform 42. As a result, the present invention discloses a filtering approach for excluding the above exception.

Figure 8:
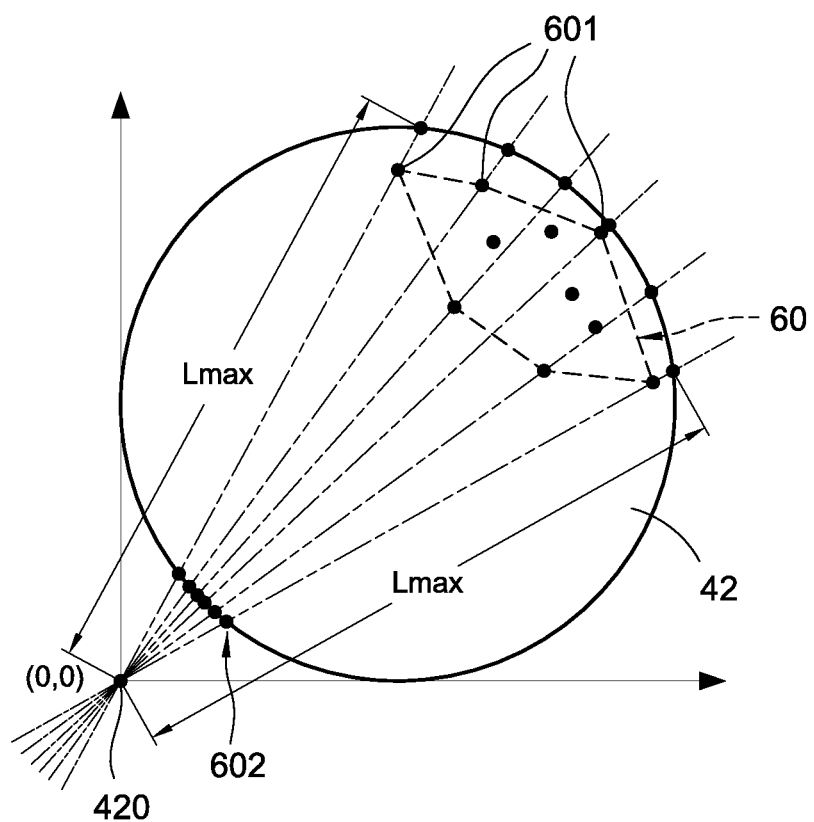
FIG. 8 is a third embodiment of a schematic diagram showing an object border of the present invention.

Please refers to FIG. 8 at the same time. FIG. 8 is a third embodiment of a schematic diagram showing an object border of the present invention. In one embodiment, the processor 41 may generate multiple straight lines that are respectively passing through one of the vertexes 601 and the basic locating point 420, obtain respectively a maximum distance $L_{max}$ between the basic locating point 420 and an intersection point of the circle equation and each straight line, and determines whether each distance between each of the vertexes 601 and the basic locating point 420 is equal to or shorter than the corresponding maximum distance $L_{max}$ (step S58). As discussed above, the step S58 is only used to determine whether the vertexes 601 of the 2D convex hull 60 are belonging to the aforementioned exception, so in some scenarios the step S58 in FIG. 9 is not necessary to be executed.

If the determination at the step S56 is positive (if the step S58 exists, the determination at the step S58 should be also positive), the processor 41 may determine that the imported 3D object does not exceed the effective range of the printing platform 42 (step S60). Otherwise, if the determination at the step S56 is negative (or the step S58 exists and the determination at the step S58 is negative), the processor 41 may determine that the imported 3D object does exceed the effective range of the printing platform 42 (step S62). After the step S60 or the step S62, the processor 41 may proceed to the step S20 in FIG. 4, so as to determine if the 3D printer 4 is permitted to perform the printing procedure.

By adapting the detecting method of the present invention, even if the printing platform 42 of the 3D printer 4 is not in a rectangular shape, the processor 41 or the computing device 5 may still quickly and accurately detect whether a to-be-printed 3D object is fully located inside the effective range of the printing platform 42 or not, which is quite convenient.

As the skilled person will appreciate, various changes and modifications can be made to the described embodiment. It is intended to include all such variations, modifications and equivalents which fall within the scope of the present invention, as defined in the accompanying claims.

What is claimed is:

1. A method for detecting object border of 3D printer adapted by a 3D printer (4) and comprising:
   a) obtaining a basic locating point (420) for a printing platform (42) of the 3D printer (4), wherein the printing platform (42) is in a round shape;
   b) projecting an imported 3D object onto a 2D plane of the 3D printer (4) for obtaining a plurality of 2D coordinates of the 3D object;
   c) calculating a 2D convex hull (60) according to the plurality of 2D coordinates;
   d) obtaining the coordinates of all vertexes (601) of the 2D convex hull (60);
   e) determining whether the 3D object is fully located inside an effective range of the printing platform (42) according to the basic locating point (420) and the coordinates of the vertexes (601), or according to a circle center (421) of the printing platform (42), a radius of the printing platform and the coordinates of the vertexes (601); and
   f) permitting the 3D printer (4) to activate a printing procedure to print the 3D object if the 3D object is determined fully located within the effective range of the printing platform (42).

2. The method in claim 1, further comprising: a step g) emitting a warning signal if the 3D object is determined not fully located within the effective range of the printing platform (42).

3. The method in claim 1, wherein the step e) comprises following steps:
- e11) obtaining the coordinates of the circle center (421) of the printing platform (42);
- e12) obtaining the radius of the printing platform (42);
- e13) calculating first distances respectively between each of the vertexes (601) of the 2D convex hull (60) and the circle center (421);
- e14) determining whether each of the first distances is longer than the radius;
- e15) determining that the 3D object is exceeding the effective range of the printing platform (42) if any one of the first distances is longer than the radius; and
- e16) determining that the 3D object is fully located within the effective range of the printing platform (42) if all of the first distances are respectively shorter than or equal to the radius.

4. The method in claim 3, wherein the step e11) is to calculate the coordinates of the circle center (421) according to the basic locating point (420) and an arranged position of the printing platform (42) in the 3D printer (4).

5. The method in claim 4, wherein the step e12) is to calculate the coordinates of each edge position of the printing platform (42) according to the basic locating point (420) and the arranged position and size of the printing platform (42), and to calculate the radius of the printing platform (42) according to the coordinates of the circle center (421) and the coordinates of any one of the edge positions.

6. The method in claim 1, wherein the step e) comprises following steps:
- e21) obtaining a circle equation corresponding to the printing platform (42);
- e22) calculating multiple first connection lines by respectively connecting each vertex (601) of the 2D convex hull (60) to the basic locating point (420);
- e23) calculating intersection information of each of the connection lines and the circle equation;
- e24) determining whether each of the connection lines only has one intersection point (602) with the circle equation;
- e25) determining that the 3D object is fully located within the effective range of the printing platform (42) if each of the connection lines only has one intersection point (602) with the circle equation; and
- e26) determining that the 3D object is exceeding the effective range of the printing platform (42) if any one of the connection lines has more than one intersection point (602) with the circle equation.

7. The method in claim 6, wherein the step e25) is to generate multiple straight lines that are respectively passing through one of the vertexes (601) and the basic locating point (420), to obtain respectively a maximum distance ($L_{max}$) between the basic locating point (420) and an intersection point (602) of the circle equation and each straight line, and to determine that the 3D object is fully located within the effective range of the printing platform (42) if each of the first connection lines is respectively shorter than or equal to each corresponding maximum distance ($L_{max}$).

8. The method in claim 1, wherein the basic locating point (420) is defined and located at a lower-left corner of the 3D printer (4).

9. The method in claim 1, wherein the 3D printer (4) comprises a processor (41), the steps a) to f) are automatically executed by the processor (41) after the 3D object is imported.

10. The method in claim 1, wherein the 3D printer (4) is an SLA-type 3D printer, the printing platform (42) is a holding tank for containing curable liquid material.

11. The method in claim 1, wherein the 3D printer (4) is an FDM-type 3D printer, the printing platform (42) is a supporting plane.

12. The method in claim 1, wherein the step b) is to project the imported 3D object onto a 2D plane upon the printing platform (42) for obtaining a plurality of 2D coordinates of the 3D object, wherein a Z-axis value of each of the 2D coordinates is zero.

* * * * *